US008260662B2

(12) United States Patent
Kaplan

(10) Patent No.: US 8,260,662 B2
(45) Date of Patent: Sep. 4, 2012

(54) SYSTEM AND METHOD FOR MANAGING PROMOTIONAL OFFERS USING A COMMUNICATIONS PLATFORM

(75) Inventor: Mark Mitchell Kaplan, New York, NY (US)

(73) Assignee: Growth & Emerging Markets, LLC, New York, NY (US)

( * ) Notice: Subject to any disclaimer, the term of this patent is extended or adjusted under 35 U.S.C. 154(b) by 237 days.

(21) Appl. No.: 12/650,628

(22) Filed: Dec. 31, 2009

(65) Prior Publication Data

US 2011/0161149 A1 Jun. 30, 2011

(51) Int. Cl.
*G06Q 30/00* (2012.01)
(52) U.S. Cl. ....................................................... 705/14.1
(58) Field of Classification Search ................... 705/14.1
See application file for complete search history.

(56) References Cited

U.S. PATENT DOCUMENTS

| | | | |
|---|---|---|---|
| 2002/0062249 A1 | 5/2002 | Iannacci | |
| 2009/0006212 A1 | 1/2009 | Krajicek et al. | |
| 2009/0076925 A1* | 3/2009 | DeWitt et al. | 705/26 |
| 2009/0271264 A1 | 10/2009 | Regmi et al. | |

OTHER PUBLICATIONS

International Search Report and Written Opinion from PCT/US2010/60250, filed Dec. 14, 2010.

* cited by examiner

*Primary Examiner* — Daniel Lastra
(74) *Attorney, Agent, or Firm* — Loeb & Loeb LLP

(57) ABSTRACT

A system and method for managing, distributing, and processing promotional offers is provided. The system includes at least one consumer interface that enables communication between the promotional offer processing system and a plurality of consumers; a consumer information database for storing consumer data for a plurality of consumer profiles; an offer catalog having a plurality of offers; a product catalog having product codes corresponding to products associated with each of the accepted offers; and an offer management module. The offer management module is configured to identify one or more of the plurality of offers to be provided to a consumer; cause the identified offers to be transmitted to the consumer; receive an indication from the consumer that the first consumer has accepted at least one of the provided offers; identify product codes corresponding to products associated with each of the accepted offers; provide the identified product codes to a transaction management system; receive information identifying whether any of the identified product codes were contained in consumer purchase transactions; and process each accepted offer for which the consumer has met the terms for the offer.

24 Claims, 7 Drawing Sheets

SYSTEM AND METHOD FOR MANAGING PROMOTIONAL OFFERS USING A COMMUNICATIONS PLATFORM

TECHNICAL FIELD OF THE DISCLOSURE

This disclosure relates generally to promotional systems and more particularly, to a system and method for aggregating or otherwise managing promotional offers using a communications platform.

BACKGROUND OF THE DISCLOSURE

Currently, promotional systems are executed in two ways. The first method is a manufacturer direct promotion, most commonly known as a rebate. In this model, consumers purchase a product then provide proof of purchase to the manufacturer by mailing in a proof of purchase or entering proof of purchase into a website. This model is both expensive for the manufacturer due to the administration cost of accepting proof of purchase, then requires the manufacturer to issue payment to the consumer via mail. The inefficiencies are found both in cost of administration and postage costs for remittance to the consumer.

The second method, commonly known as "coupons," involves a promotional discount code that is generally found in physical form as Free Standing Inserts or "FSIs". These require consumers to select their desired offers and bring the promotional media with them to the store. These FSIs are then scanned and applied to the total cost at checkout. FSIs are generally inefficient for consumers because the consumers often leave the physical media at home. From a marketers perspective, there are also inefficiencies due to the inability to provide coupons that can be utilized across various retailers.

Accordingly, there is a need for a system and method for handling promotional savings that reduce the inefficiencies for both consumers and marketers.

SUMMARY OF THE INVENTIONS

The invention comprises novel systems and methods for distributing, managing and processing product promotions using electronic communications. The system includes one or more user interfaces to permit a consumer to register with the system using any one of a plurality of methods, such as SMS, Internet-based web sites, instant messaging, etc. In one aspect, the system may also utilize voice recognition with voice SMS to enable consumers that have difficulty using other methods (e.g. text-based methods) to communicate with the system. In this instance, any response messages sent from the system to the consumer may also be a combination of text with corresponding audio. Using any of these methods, the consumer registers with the system. Information is then obtained for a payment account for a preferred payment management system (such as a credit card company, a credit card issuer bank, PayPal, Google Checkout, or the like). The payment account is linked with a consumer ID, such as a mobile communication number, email address, or user name, along with other consumer information.

In accordance with one embodiment, the present system may include a offer management module that is configured to communicate and interact with one or more marketers and payment management systems. The offer management module is configured to maintain a database of offers that have been provided by marketers (or other offer providers). These offers may be identified by SKU or other unique identifier.

After a consumer is registered with the system, the offer management module sends selected ones of the product offers to the consumer, preferably using the mobile account number, email address, instant messaging account, or other communication address associated with the consumer. Each offer may identify the specific terms of the offer, such as the products involved, and any discount that is being offered with a purchase of those products.

The selection of the offers to send to a selected consumer may be based on demographic information, the consumer's purchase history (i.e. which product offers the consumer has previously accepted), preferences self-identified by the consumer, or other criteria. In some embodiments, other offers may also be sent to the end users from third parties (for a fee) via the system. In one embodiment, those offers may also be automatically fulfilled using third party software.

The offer management module may also be configured to receive a consumer's acceptance of an offer. For example, if a consumer would like to take advantage of a provided offer, the consumer may indicate their desire to do so, preferably (although not necessarily) using the same communication method by which the offer was sent to the consumer. Thus, if a consumer received an offer using SMS text messaging, the consumer may accept the offer by providing a response SMS text message. Of course, it is possible that the consumer may accept the offer using a different communication method.

After the offer management module receives a consumer's acceptance of an offer, the offer management module may transmit, to the consumer's preferred transaction management system, information identifying the products associated with the discount offer. The information identifying the products may comprise a product SKU number, UPC code, or another type of product identification. This aspect of the disclosure may be referred to herein as the "SKU-to-basket pivot."

When the consumer uses the registered payment method to make a purchase at a merchant, the transaction management system communicates with the merchant's point-of-sale system to determine whether the consumer's purchase includes any products for which the consumer had accepted an offer. If the consumer's purchase includes a product on which the consumer had accepted an offer, the transaction management system transmits this information to the offer management module, which then preferably transmits (in real time) a message to the consumer indicating that the discount is being applied, and then applies the proper discount amount to the consumer account. This approach engages the end user in a new consumer experience, which may further engender good will for the product marketer or supplier. In addition, this approach provides a model in which consumers can receive directed offers from marketers, and then automatically obtain discounts for product purchases without handling physical coupons or rebates, and without having their payment account information disclosed to marketers. Moreover, this methodology relieves the marketers of some of the offer management headaches associated with the prior art paper offers.

In one aspect, the offer management module may be configured to apply the discount by communicating with one or more wireless service providers to apply the discount amount as a credit on the consumer's wireless service bill. In another aspect, the discount may be applied directly to the consumer's credit card account.

In yet another aspect of the invention, the system may also be configured to maintain a virtual debit account that is linked to the consumer's consumer ID. In this case, any rebates, coupons, or other promotions may be applied directly to the consumer's virtual debit account. If a consumer provides their consumer ID during a purchasing transaction, all or part of the credit stored in the virtual debit account may also be applied to the consumer's transaction. In one embodiment, the virtual debit account may be used for purchases at any merchant, although the virtual debit account may also be configured to be merchant-specific (i.e. usable with only one or more specific merchants).

In addition to discount offers, the system may also be configured to provide to consumers offers that do not require future purchases by the consumer in order to obtain the benefit of the offer. Such offers may include, for example, offers for free samples, offers for free downloadable content, offers to purchase a product at a reduced price, etc. In this case, the system may be configured to process such offers upon the consumer's acceptance using the appropriate fulfillment services and, when applicable, the appropriate consumer payment method. If the offer is one that involves a consumer payment to receive the offer (such as where the offer is for the purchase of a product at a specific price), additional security measures may also be provided by requiring the consumer to provide a previously registered code, or by transmitting to the consumer a verification message using at least one of the consumer's registered communication methods.

The system may also include an interactive media messenger module which allows for cross e-retailer searching and shopping while making purchases via auto-responders in IM (Instant Messenger) or social media applications like FaceBook or Twitter. Essentially, the interactive media messenger module is a personalized offer portfolio that follows consumer around the Internet without being too intrusive or otherwise alarming. For instance, if an end user wanted to purchase a telescope, they would, in one approach, search for a telescope in the IM window and then open a separate browser under the IM window to see the product at particular web site while allowing order placement in the IM window. If the consumer indicates an acceptance of an offer, the system will cross-reference the consumer log-in information with the consumer's mobile number (or other unique identifier associated with a mobile account) for a two-factor secure checkout. A similar experience could be had by the end user using the social media application approach, as would be understood by those skilled in the art having the present disclosure before them.

BRIEF DESCRIPTION OF THE FIGURES

Various embodiment of the disclosure are now described, by way of example only, with reference to the accompanying figures.

Skilled artisans will appreciate that elements in the figures are illustrated for simplicity and clarity so not all connections and options have been shown to avoid obscuring the inventive aspects. For example, the dimensions and/or relative positioning of some of the elements in the figures may be exaggerated relative to other elements to help improve the understanding of various embodiments of the present disclosure. Also, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION OF THE DISCLOSURE

Figure 1:
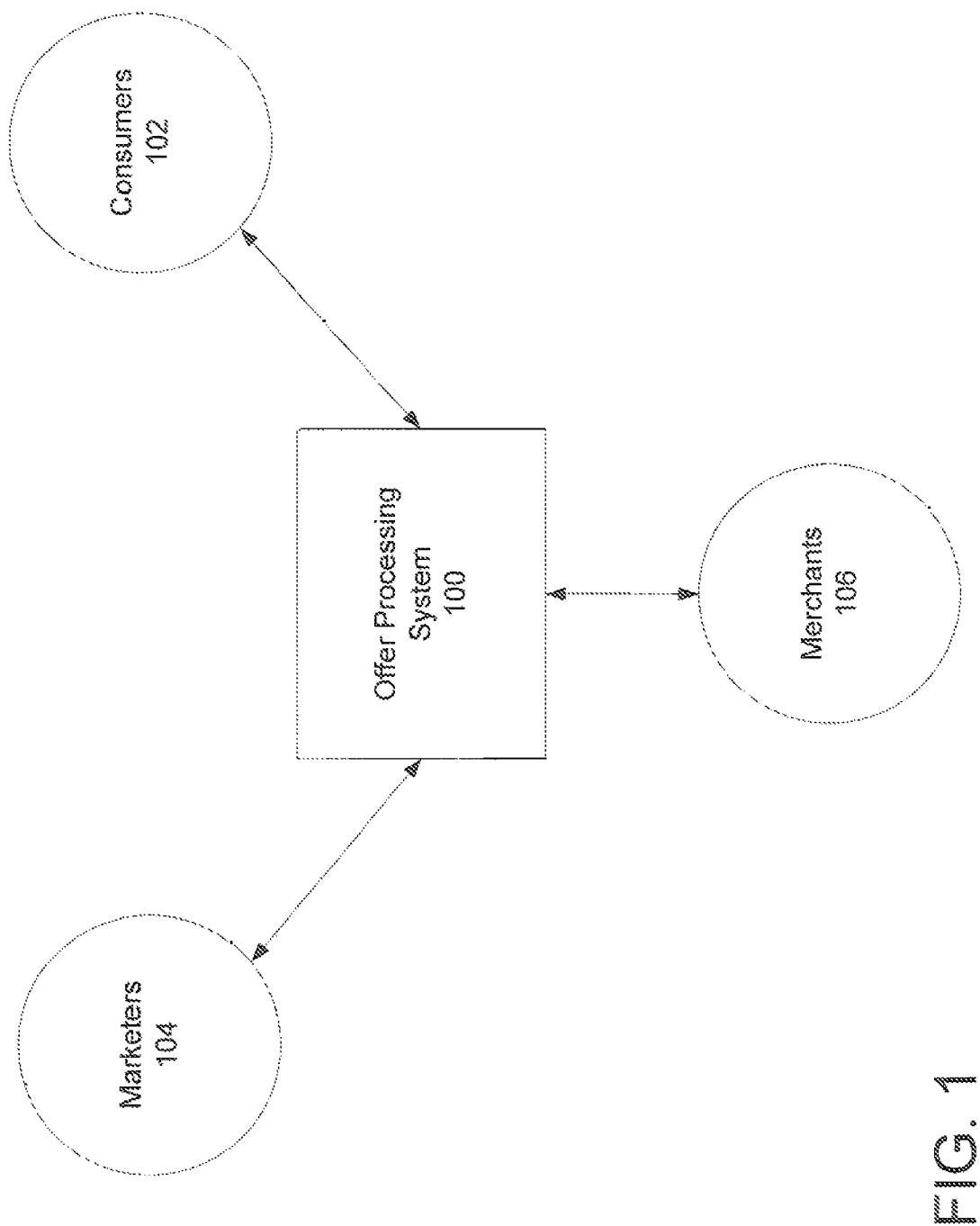
FIG. 1 shows one embodiment of a system in accordance with the present invention.

The present invention provides systems and methods for distributing, managing, and processing product promotions using electronic communications. As shown in FIG. 1, an offer processing system 100 is provided that communicates with consumers 102, marketers 104, and merchants 106. More specifically, the offer processing system creates a global, ubiquitous marketplace of offers for the products of marketers 104, which may be distributed to the consumers 102 using any type of electronic communication method or technology, utilized by consumers 102 at any merchant 106, and redeemed automatically and in real time by the offer processing system 100, while simultaneously engendering goodwill and fostering brand loyalty. For purposes of this disclosure, a "marketer" is defined as any provider of products (which may be goods, services, downloadable content, etc.), including manufacturers, wholesalers, retailer, or the like. A "merchant" is defined any entity or business that sells the products of a marketer to consumers. Of course, it should be understood that in some instances, a marketer may also be a merchant.

System Architecture

Figure 2:
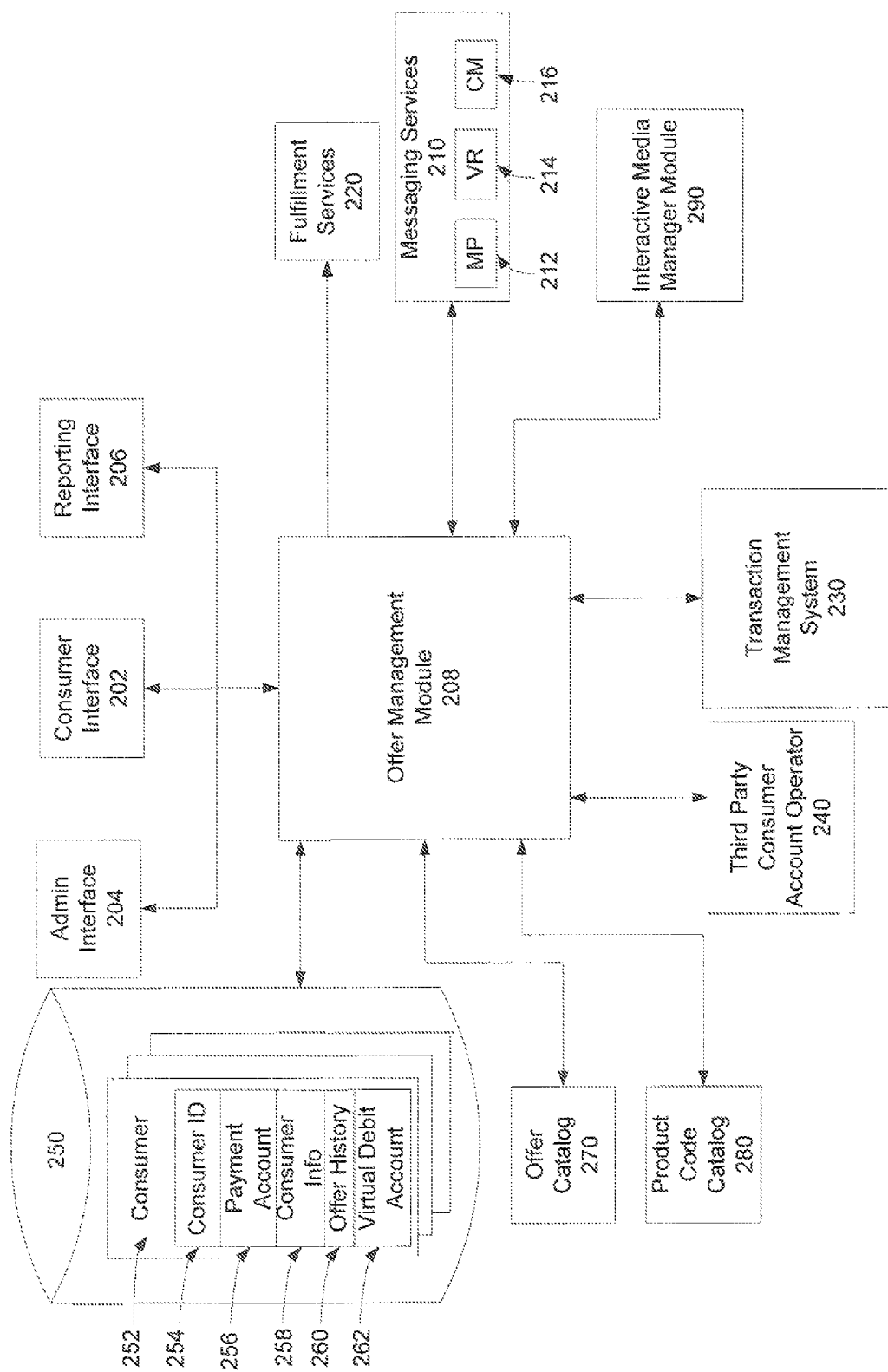
FIG. 2 shows one embodiment of offer processing system 100 of FIG. 1 in accordance with the present invention.

FIG. 2 illustrates one exemplary embodiment of the system architecture for an offer processing system 100 in accordance with the present invention. The offer processing system 100, as shown, may include a plurality of user interfaces, including one or more consumer interfaces 202, administration interfaces 204, reporting interfaces 206. The consumer interfaces 202 may be configured so as to permit consumers to register and communicate with the system 100 using any one of a plurality of communication methods. For example, the system may include consumer interfaces to enable consumer communications using SMS, Internet-based web sites, mobile web sites, voice SMS, instant messaging, interactive voice response (IVR) via any audio connection with DTMF (mobile phone, landline, etc.), or the like. The administration interface 104 may be configured to permit the management and administration of information relating to offer campaigns. The administration interface 104 may also permit new marketers or other offer providers to register with the system in order to initiate new offer campaigns. The reporting interface 106 may be configured to permit tracking of the distribution and usage of provided offers.

An offer management module 208 is in communication with the user interfaces 202-206. The offer management module 208 is configured to manage and process consumer communications, identify offers to be distributed to consumers, and cause appropriate actions to be taken in order to complete an offer when the offer criteria are met by a consumer. To aid in these tasks, the offer management module 208 may be configured to communicate with messaging services 210, fulfillment services 220, a transaction management system 230, and a third party consumer account operator 240.

The messaging services 210 preferably include one or more messaging platforms 212 configured to receive and transmit consumer communications via one or more communication networks, such as cellular networks, wi-fi, Internet, or the like. The messaging services 210 may also include voice recognition software 214 for translating consumer communication from voice to text, content management services 216 for hosting web site data, and interactive voice responses services. The fulfillment services 220 may include any type of service that facilities processing, packaging, shipping, downloading, or any other actions that may be necessary to complete offers that may involve delivery of products to the consumer.

The transaction management system 230 is configured to process purchase transactions initiated by a consumer at a merchant. For example, in one preferred embodiment, the transaction management system may be a credit card system, such as Mastercard®, Visa®, American Express®, Discover®, or the like. However, the transaction management system may be any type of system that permits consumer purchases, including PayPal, Google Checkout, etc.

The third party consumer account operator 240 may be any entity that provides services for consumers in which a billing statement is provided to the consumers on a regular basis. This may include, for example, wireless service operators, land-line telephone operators, television providers, household utilities, and banking services.

As shown in FIG. 2, the offer management module 208 may also be in communication with a consumer information database 250, an offer catalog 270, and a product code catalog 280. The consumer profile database 250 is configured to store data regarding each consumer registered with the system 100. For each registered consumer 252, the stored data may include a consumer ID 254 (which may be a mobile communication number, an email address, a user name, or the like), and information identifying one or more preferred payment accounts 256 (such as a credit card account, PayPal account, Google Checkout account, or the like). As shown in FIG. 2, the stored data may also include additional consumer profile information 258, such as sex, age, location, and/or any other information that may be indicative of spending habits or preferences of the user. The consumer profile information may also include identification of one or more third party consumer account operators at which the consumer has an account, and/or a pin number or password for the consumer. The stored data may also include an offer history 260 to identify the offers which have been provided, accepted, or completed by the consumer; and/or information regarding a virtual debit account 262 that may be established for the consumer.

The offer catalog 270 includes information identifying a plurality of promotional offers. For reference, each of the offers in the offer catalog may also be associated with a specific code, such as an SKU number or other unique identifier. Each offer may also be associated with one or more destination addresses (such as telephone numbers, SMS text short codes, an email addresses, or the like) and one or more keywords. As will be described in more detail below, these addresses and keywords may be used to identify offer campaigns that are being responded to or requested by a consumer.

The offers in the offer catalog 270 may be provided directly by marketers. However, it should be understood that offers may also be provided by offer aggregators or similar agencies. For purposes of this description, any entity or party that provides an offer is referred to as an "offer provider." The available offers in the offer catalog may also be of any type. For example, the available offers may include discount offers, such as rebates or coupons. For instance, a consumer products company may offer $1.00 off with the purchase of a 5 pack of disposable razor blades with a 10 oz. can of shaving gel. The offers may also include, for example, product offers such as free sample offers, free downloadable content offers, or reduced-price product purchase offers. Other types of offers may also be provided, and although not every type of potential offer may be explicitly described herein, it is contemplated that the present invention can be utilized in conjunction with any type of promotional offer.

The product code catalog 280 includes product codes for products associated with offers in the offer catalog. For example, if the offer catalog includes a rebate offer on a certain telescope product, the product catalog preferably includes a product code associated with that telescope. The product codes may be an SKU number, a UPC code, or any other unique identifier code that may be used to identify the product during a consumer purchase transaction. The product codes may also be obtained from various sources, such as product marketers, merchants, or a third party agencies.

Although the consumer information database 250, offer catalog 270, and product code catalog 280 are shown as three distinct elements in FIG. 2, it should be understood that the information for each may be stored in a single database or distributed among numerous databases. It should also be understood that the offer and product catalogs need not be maintained by the offer processing system 100, but may alternatively be maintained by third party databases that can then be accessed by the offer processing system when needed.

Finally, the offer management module 208 may also be configured to be in operable communication with a social media manager module 290. As will be described in more detail below, the social media manager module 290 may allow consumers to interactively search and identify available offers in real time via auto responders using instant messaging or social media like Facebook and Twitter.

Consumer Registration

Figure 3:
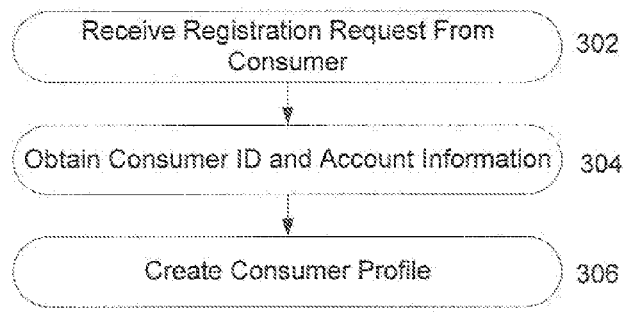
FIG. 3 shows a flow diagram illustrating one potential embodiment for registering a consumer with the offer processing system.

FIG. 3 illustrates a process for registering a consumer with the offer processing system 100. In step 302, the offer processing system 100 receives a registration request from the consumer. The registration request may be received using any communication method including SMS text messaging, voice SMS, instant messaging, IVR, or a web site. A consumer may also be induced to register using various methods. For example, in one embodiment, an email, voice message, text message, instant message, or other communication may be sent directly to the consumer with an invitation for the consumer to register. In this case, the consumer may be able to transmit a registration request simply by replying to the invitation message. Print, television, radio, or web advertising may also be used to invite consumers to register. In one embodiment, the advertising may also provide a specific destination address (such as an email, website, telephone number, or text short-code) and a keyword to be transmitted to the destination address. The address and keyword for a received registration message may then be checked against the offer catalog 270 to identify the associated offer campaign (or campaigns), and then, if appropriate, associate the consumer's profile with a specific set of offers for the advertising campaign.

In step 304, consumer data is obtained for the registering consumer. This may include obtaining the consumer ID, information identifying one or more consumer payment accounts, and any other consumer profile information. This information may be obtained using various methods. For example, in one embodiment, the originating email or phone number of the consumer's registration request may be used to set the consumer's ID. This information may also be automatically cross-referenced against information maintained by a transaction management system 230, a third party consumer account operator 240 or other entity to obtain payment account information as well as other information regarding the consumer. Alternatively, a consumer may also be asked to manually provide or input certain information. The obtained consumer data is then used to create a consumer profile in the consumer information database 250 in step 306.

Figure 4A:
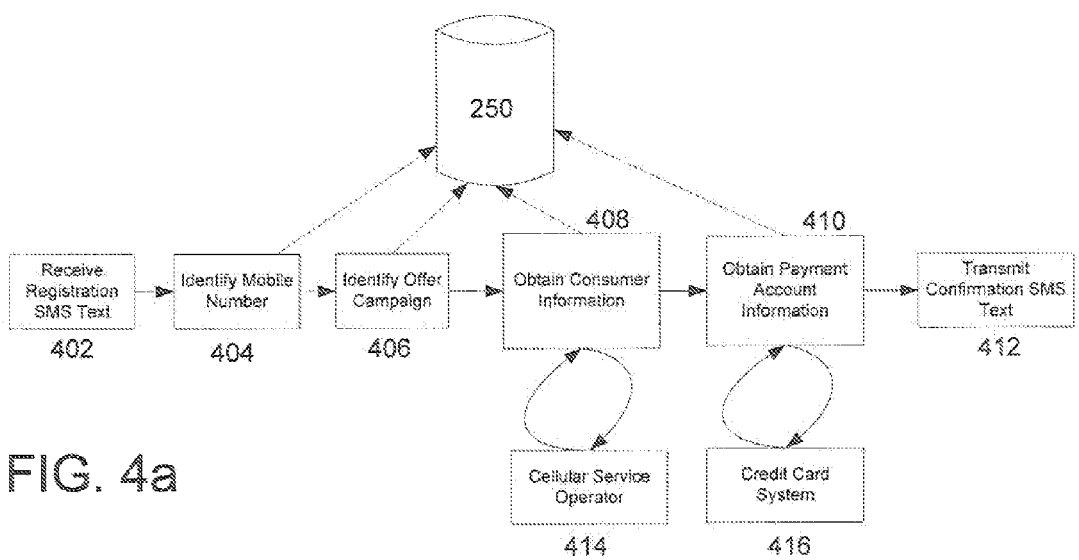
FIGS. 4a and 4b show exemplary methods for registering a consumer with the offer processing system using SMS text messaging and voice SMS, respectively.
Figure 4B:
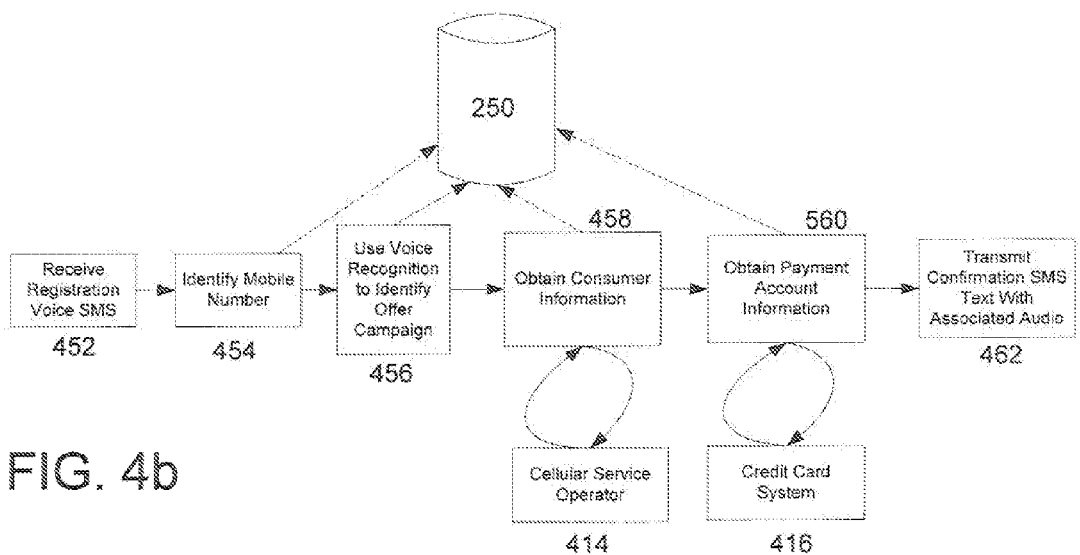

For illustration purposes, FIGS. 4a and 4b shows two preferred methods for registering a consumer using SMS text messaging and voice SMS, respectively. However, it should be understood that these are but two exemplary embodiments and are not intended to limit the scope of the present invention.

Turning first to FIG. 4a, a consumer's registration request is received as an SMS text message in step 402. In step 404, the consumer's mobile telephone number is automatically identified from the SMS message header. Methods for identifying an incoming mobile telephone number are well-known and are therefore not discussed in any more detail herein. The mobile telephone number is then assigned as a consumer ID and stored in the consumer information database 250.

In step 406, it is determined whether the consumer's profile is to be associated with a specific offer campaign. For example, if the consumer's registration request was transmitted to a text address associated with a specific set of offers, and/or contained a keyword associated with a specific set of offers, the consumer's profile in the consumer information database 250 would set accordingly. Of course, if the registration request did not include such information, the consumer's profile may be established without indicating any offer preferences.

In step 408, offer processing system communicates with a database maintained by a wireless service operator 414 (such as Verizon, AT&T, Sprint, U.S. Cellular, or the like) associated with the consumer's mobile telephone number to obtain additional consumer information. This may include, the consumer's name, address, account status (i.e. post-pay or pre-pay) and account type (i.e. individual, multi-user, family plan, etc.). This information is then also stored the consumer information database 250. As a result, the consumer's profile may be established automatically without requiring the consumer to transmit or enter their information. Of course, it is understood that the specific information that may be accessible may be based on an immediate or previously provided opt-in authorization from the consumer.

In step 410, a consumer payment account is automatically located by cross-referencing the consumer's mobile telephone number against the database for a credit card system 416, and locating a credit card account with which that number is associated. If such a credit card account exists, this information is identified in the consumer's account. The consumer's full credit card account number need not be stored in the consumer information database. Instead, the consumer information database preferably stores information identifying that the credit card system does indeed have a credit card account associated with the consumer's mobile phone number. The consumer's mobile phone number (or other established unique identifier) may then be used as an identifier of the consumer's credit card account in subsequent communications or transmissions between the offer management module 208 and the transaction management system 230. Of course, it is understood that other information, such as the last 4 digits of the consumer's credit card account, may also be stored and utilized to aid in identifying the consumer's credit card account.

If a credit card account for the consumer could not be located in step 410, the consumer may also be asked to either identify a billing phone number that is linked to a consumer's credit card account, input a preferred credit card account number, or choose to have a virtual debit account established. Alternatively, the system may invite the consumer to call their credit card issuers to add the mobile number to the credit card account and then return to register with the system 100. If the consumer's credit card is associated with multiple numbers it would be possible for each individual number to establish a separate account within system 100. If multiple credit card accounts were found to be associated with the consumer's mobile phone number, the consumer may also be prompted to select which of the credit card accounts are to be used.

In step 412, the offer processing system 100 transmits to the consumer a confirmation SMS text message informing the consumer that the consumer has been registered and will begin receiving offers. The confirmation message may also identify one or more means, such as a web site or downloadable application or widget, by which the consumer can access their profile, add or alter information, and change their preferences. The confirmation message may also include requests that the consumer provide additional information, either by reply SMS, through an identified website, or any other communication method. For example, the confirmation message may request that the consumer provide a pin code for accessing the consumer's account. If the consumer's registration request did not include information identifying a specific offer campaign, the consumer may also be asked to select among the types or categories of offers that the consumer may wish to receive.

FIG. 4b illustrates another exemplary method for registering a consumer. In this instance, voice SMS is utilized so that the offer processing system 100 can be accessed by consumers that have difficulty with text messaging. In this embodiment, a consumer transmits a registration request message using voice SMS in step 452, and the consumer's mobile telephone number is automatically identified in step 454. In step 456, voice recognition software 214 is used to translate the contents of the registration request voice SMS message and identify keywords, if any, that may have been transmitted in the message. These keywords, along with the address to which the message was transmitted, may then be used to identify one or more corresponding offer campaigns that are to be associated with the consumer's profile.

Additional consumer information may be obtained from the consumer's wireless service operator 414 in step 458; and the consumer's payment account information is identified from the credit card system 416 in step 460. In step 462, the offer processing system 100 transmits to the consumer a confirmation message. As noted above, the confirmation message may inform the consumer that they have been registered, and may also request addition information. In this embodiment, the confirmation message is preferably a SMS text message with accompanying audio. If the consumer responds with addition information using voice SMS, the voice recognition software 214 may again be utilized to translate and identify the transmitted information.

Offer Identification and Provisioning

Figure 5:
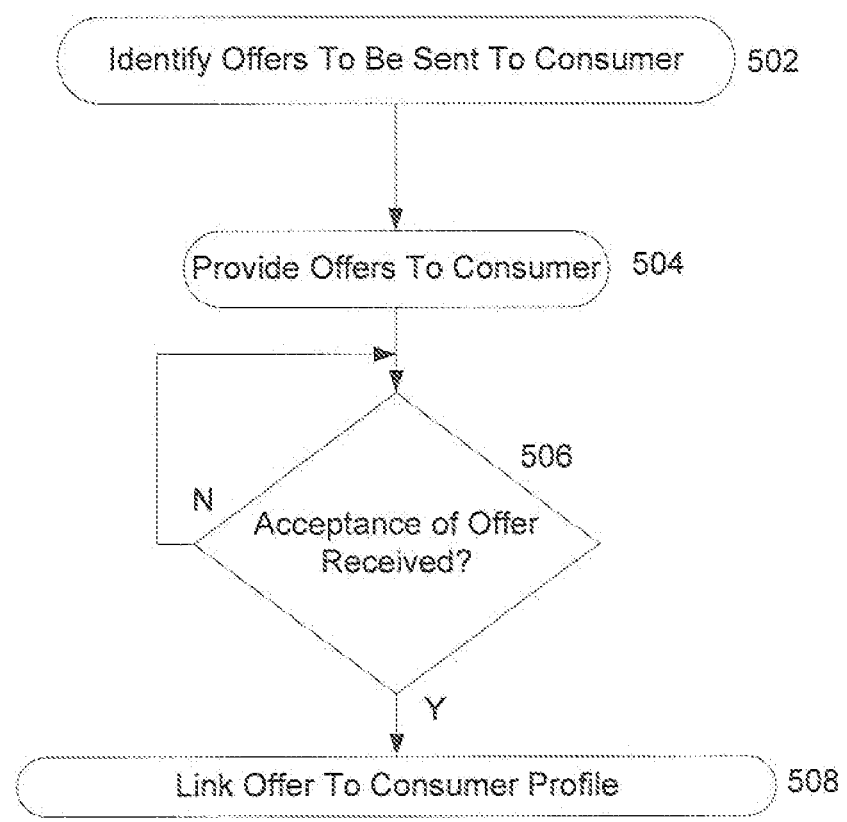
FIG. 5 shows a flow diagram illustrating one potential embodiment for identifying and provision offers to registered consumers.

FIG. 5 illustrates one exemplary process for providing offers to registered consumers. In step 502, the offer management module 208 identifies one or more offers to be provided to a consumer that has been registered with the offer processing system 100. The identification process may be based on a variety of factors. In one embodiment, if the consumer had registered using a destination address or keyword associated with a specific offer campaign, the offers associated with that offer campaign may be identified. In another embodiment, the selection of which offers are to be sent to a consumer may be based on demographic information obtained during registration of the consumer. In yet another embodiment, the consumer's spending history, including the history of which offers the consumer has previously accepted, may be used to identify offers that the consumer is most likely to accept in the future. Other criteria may also be used, and more than one of these criteria may also be used in conjunction with one another. In one embodiment, some or all of the collected demographic information or spending history information may also offered and shared with third party consumer account operators and/or the transaction management system as an additional incentive for providing access to the information in their databases.

The identified offers are provided to the consumer in step 504 using the mobile telephone number, email address, instant messaging account, or other communication address associated with the consumer. For example, in one embodiment, if the consumer registered using a SMS text message, the offer processing system 100 may be configured to transmit offers using SMS text messages. However, it should be understood that the consumer may be permitted to set their communication preferences to identify their preferred communication method. In one embodiment, a website or IVR system may also be provided to enable consumers to access a list of all offers that have are available to them.

Each offer provided to a consumer preferably includes the details of the offer, such as the products involved, the amount of rebate or coupon being offered with a purchase of one or more products, or the like. The offer may also include instructions for accepting the offer. For example, an offer provided via SMS text message may include an instruction to text back the word "YES" if the consumer would like to accept the offer.

Preferably, offers are identified and provided to registered consumers on a periodic basis. However, offers may also be provided as soon as new offers become available. The frequency and number of offers that a consumer may receive within a given time period may also be selectable as a consumer-configurable preference.

In step 506, it is determined whether the consumer has accepted an offer. In one embodiment, an offer may be deemed accepted if the consumer provides an appropriate response to a provided offer. For example, if the provided offer was sent using SMS text with instructions that the offer may be accepted by responding with a particular phrase, the consumer can accept the offer by providing an appropriate response SMS text message. Of course, the offer need not be accepted using the same communication method in which it was sent. For example, a consumer may receive an offer via SMS text message, but may choose to accept it by logging into a web site. Once a consumer accepts an offer, the offer is linked to the consumer's profile in step 508.

Offer Processing

Figure 6:
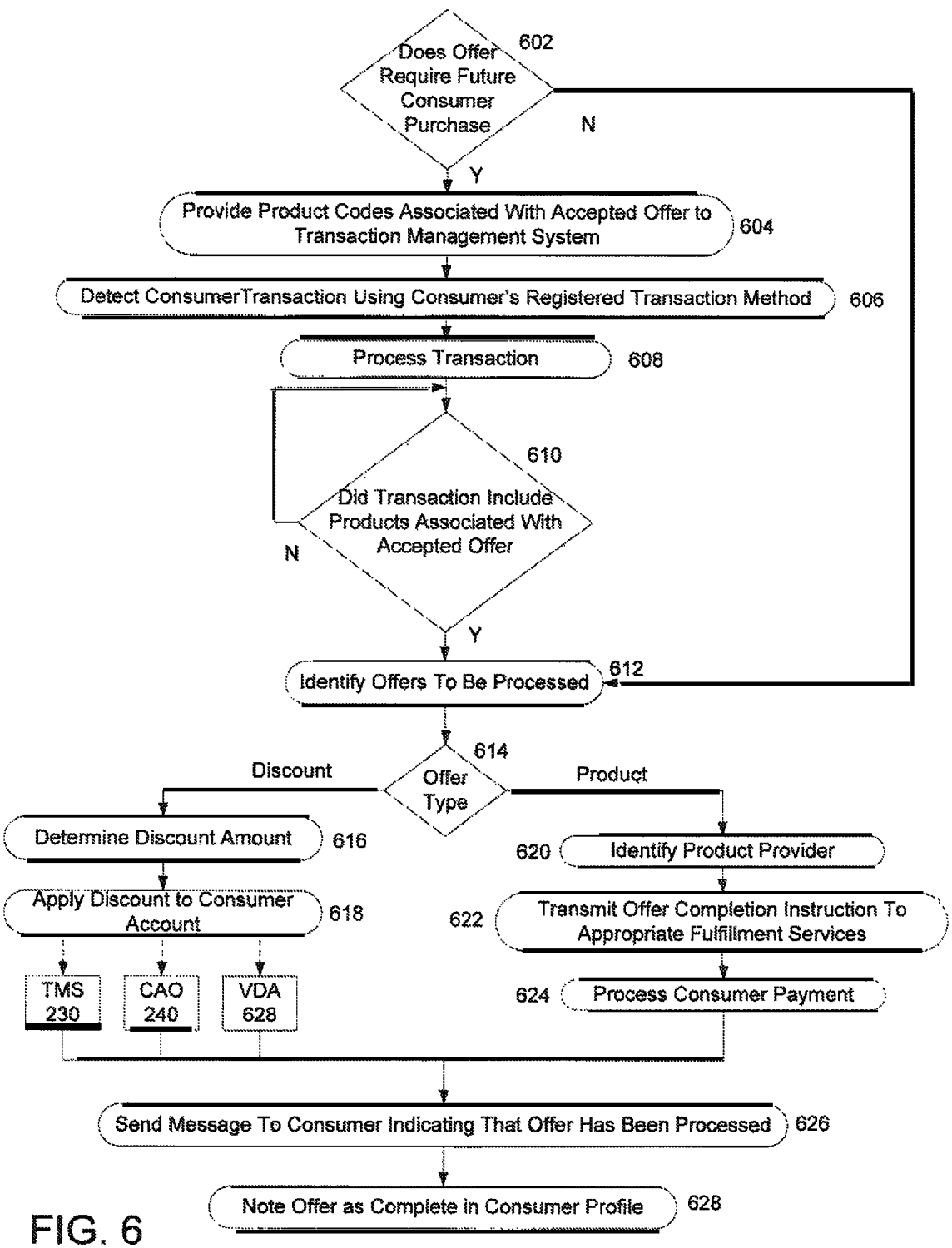
FIG. 6 shows a flow diagram of one potential embodiment for processing offers.

FIG. 6 illustrates an exemplary method for processing offers that have been accepted by a consumer. In step 602, it is determined whether the accepted offer requires a future consumer purchase. For example, if the accepted offer was a rebate or coupon for a product, that offer generally can be completed only if the consumer actually purchases the product. On the other hand, an offer for a free product sample, or an offer to directly purchase a product, may require no future consumer purchase. If a future purchase is not required, the process proceeds to step 612, where the offer is completed. If a purchase is required, the process proceeds to step 604.

In step 604, the product codes associated with each offer accepted by a consumer are identified to the transaction management system corresponding to the consumer's registered payment method. When a consumer transaction using the registered payment method is detected (in step 606), the transaction management system processes the transaction (in step 608) in accordance with well-known methods. For example, if the registered payment method is a credit card, the details of the consumer transaction are received by a credit card processor network and forwarded to the bank that issued the card. The issuer bank then checks the consumer's account, verifies the consumer has adequate credit to cover the purchase, and sends the merchant an authorization for the purchase.

In accordance with the present invention, the transaction management system also communicates with the merchant point of sale terminal, in step 610, to determine whether the consumer's purchase basket included any products associated with an offer that had been accepted by that consumer. For example, in one embodiment, the transaction management system 230 may transmit to the merchant point of sale terminal information (i.e. SKU code, UPC number, or other identifier) identifying the products for those offers that the consumer had previously accepted. In response, the transaction management system 230 may receive an indication from the merchant point of sale terminal identifying whether each such identified product was included in the purchase. Of course, it should be understood that other methods for relaying product codes information from the merchant point of sale terminal to the transaction management system may also be used. The point of sale terminal may also be in a physical location, online in the case of e-retailers, or a database clearing house for batch processing.

If the consumer's purchase did include products associated with offers that had been accepted by that consumer, information identifying those products is transmitted to the offer management module 208, which, in step 612, checks the purchased product codes against the consumer's accepted offers to determined whether there are any offers that have been completed and require processing. The manner in which the offer is processed depends on the type of offer (step 614). In some embodiments, if the consumer's purchase included only a portion of what was necessary to redeem an offer, the management module may send a message to the consumer informing them that they did not make the necessary purchases to redeem the offer. A similar message may be sent the consumer if an offer is nearing its expiration date to encourage the consumer to comply with the offer (or at least reconnect the consumer with the marketer).

If the offer involves a discount, such as a rebate or coupon, the offer management module 208 determines the discount amount in step 616 and applies the discount to an account associated with the consumer in step 618. As shown in FIG. 6, the discount may be applied to any one of various consumer accounts. For example, in one aspect of the invention, the offer management module may be configured to communicate the discount amount to the transaction management system along with the mobile telephone number or other identifier of the consumer account to which the discount is to be applied. The transaction management system would then utilize this information to apply the indicated discount value as a credit to the consumer's registered payment method. Thus, if the consumer's registered payment method is a credit card, the discount would appear as a credit on the consumer's credit card statement. The offer management module 208 may also be configured to transmit, to the transaction management system, an identification of the offer provider associated with the applied credit, or specific instructions identifying the notation to be included along side the applied credit. As such, the consumer's billing statement may also indicate the marketer, or other offer provider, that was responsible for the discount in order to further engender good will towards the offer provider.

In another aspect, the discount amount may be applied to a consumer's billing statement from a third party consumer account operator 240. To accomplish this, the offer management module 208 may transmit, to the third party consumer account operator 240, information identifying the consumer, the discount value that is to be applied to consumer's bill, information to identify the offer provider associated with the offer, and/or a confirmation of validation. This information may be transmitted within a transaction message that corresponds appropriately to the requirements of the operator billing gateway.

For example, in one preferred embodiment, the third party consumer account operator 240 may be a wireless service provider. In this case, the consumer's mobile phone number may be used to identify the consumer. In one embodiment, the format of the transaction message may also be similar to that a premium SMS messages (which are well known in the art). However, where a premium SMS message is designed to add charges to a consumer's account for various content or services (such as downloadable ringtones, or voting for a television program), the transaction message in accordance with the present invention is configured to instruct the wireless service provider to provide a credit to a consumer's account.

In yet another aspect, the offer management module may be configured to apply the discount value as a credit directly to a virtual debit account that was created for the consumer. The credit stored in the virtual debit account may then be used by the consumer towards future purchases. For example, if the consumer provides their consumer ID during a future purchase using the their registered payment method, all or part of the credit stored in the virtual debit account may be applied to the consumer transaction. In another embodiment, the virtual debit account may function as a gift card that is applied automatically to any purchase using the consumer's registered payment method. Preferably, the virtual debit account is configured for use with purchases made at any merchant. However, it is also contemplated that credits in the virtual debit account may be merchant-specific and usable only with one or more specific merchants.

The selection of which consumer account the discount value is to be applied may be based on any one or more of various factors. For example, in one embodiment, the consumer may be able to select their preferences using one or more consumer interfaces. In another embodiment, the consumer account to which the discount for a particular offer is to be applied may be selected by the offer provider. In yet another embodiment, the offer management module 208 may be configured to select the consumer account based on the type of offer. For example, discounts classified as rebates may be applied to a different account that discounts classified as coupons.

Returning to step 614, if the offer being processed includes products that are to be provided to the consumer, the appropriate product provider is identified in step 620. The details of the product or products that are to be provided to the consumer are forwarded to the appropriate fulfillment service in step 622.

In step 624, any payment transaction that may be required on behalf of the consumer is also processed. In one embodiment, the payment may be processed using the consumer's registered payment method. For example, if the consumer accepted an offer to purchase a 5-pack of razor blades for $2.00, the registered payment method (such as a credit card, Paypal account, Google Checkout account, etc.) associated with the consumer's profile is billed $2.00. Furthermore, as noted above the consumer's full payment account information preferably is not maintained in the consumer information database and is therefore not directly accessible by the offer management module. Accordingly, to process a consumer payment, the consumer ID or other identifier information is referenced and used to transmit a payment request to the appropriate transaction management system, which then completes the transaction and sends back to the offer management module an approval token with confirmation data. In another embodiment, the consumer payment may also be debited from an existing balance in the consumer's virtual debit account. To minimize the risk of fraud, the consumer may also be requested to enter a previously provided passcode or other identification information in order to complete an offer in which the consumer is being charged. A message may also be sent to the consumer using the consumer's preferred communication method in order to verify the purchase with the consumer.

In step 626, the offer management sends a confirmation message to the consumer indicating that the offer has been processed. The consumer's profile is also updated in step 628 to indicate that this offer has been completed.

Interactive Media Messenger

As noted above, the offer management module 208 may also be in communication with a interactive media messenger module 290. In accordance with the present invention, the interactive media messenger module 290 includes one or more bots that function essentially as automated "peers" or "friends" that provide an interactive online vehicle to engage consumers, permit real-time offer searching, and cross e-retailer shopping. In this embodiment, various keywords or terms may also be associated with various offers in the offer catalog to enable consumers to search, identify, and accept offers using peer-to-peer communication.

Figure 7:
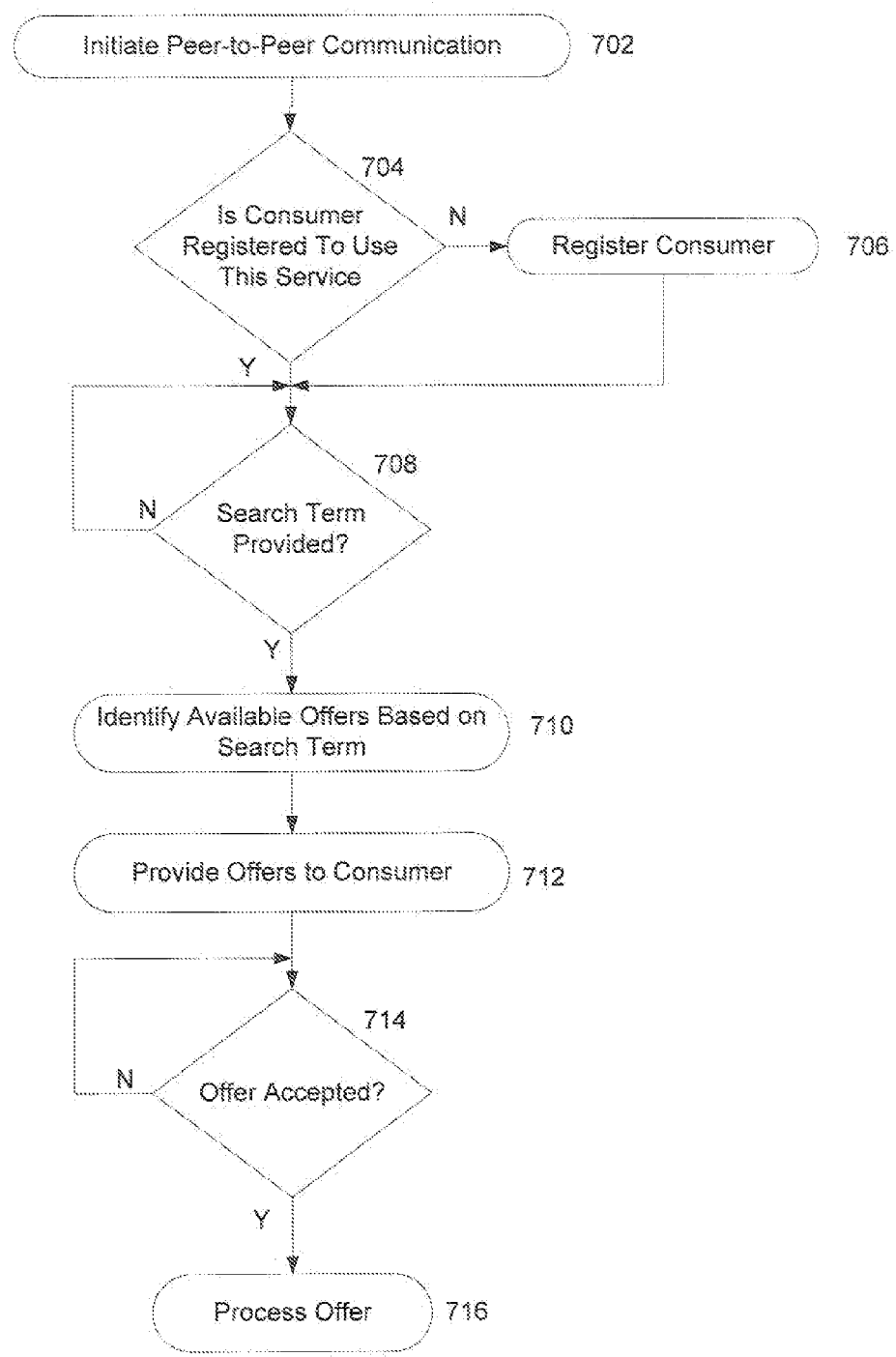
FIG. 7 shows a flow diagram of one potential embodiment for providing offers using the interactive media messenger module.

FIG. 7 illustrates one exemplary embodiment process for managing communications via the interactive media messenger module 290. In step 702, the interactive media messenger module 290 detects a peer-to-peer communication that was initiated by the consumer. For example, this may involve detecting a consumer-initiated Instant Message chat with a predefined Instant Messaging account associated with the offer processing system 100. It may also involve the consumer initiating communication with an social media account associated with the offer processing system 100 using social media like Twitter or Facebook. In yet another embodiment, the consumer may also initiate the communication using SMS, proprietary widgets, smart phone applications, or any other type of peer-to-peer communication.

In step 704, the originating address for the consumer's communication (e.g. Instant Messaging account, Twitter account name, Facebook profile name, or mobile phone number) is checked against the consumer information database 250 to determine whether the consumer has been registered to interact with the interactive media messenger module 290 using the particular peer-to-peer communication method. If not, the consumer may be asked to register for this service in step 706. For example, the consumer may have previously registered by SMS but never provided Instant Messaging account information. In this case, if the consumer attempts to use Instant Message chat to access the offer processing system, the consumer may be asked to identify the mobile phone number, pin code, or other information that was previously used during registration with the system 100. Once provided, the consumer's instant messaging account may be linked to their consumer profile. The same process may be used for other communication methods as well.

In step 708, the interactive media messenger module 290 waits for the consumer to input a search term. Once a search term is received, the interactive media messenger module identifies available offers based on the search term by referencing the data, including product names, brand names, keywords, and the like, that are stored in the offer catalog in step 710. The matching offers are then transmitted back to the consumer in step 712. As a result, consumers can interactively search for and locate offers for products they may be interested in, and perform comparison shopping across numerous retailers.

In step 714, it is then determined whether the consumer has accepted any of the provided offers. If an offer is accepted, it is linked with the consumer's profile and processed in step 716. In one embodiment, all search requests may also be saved automatically for the consumer's profile so that the results of such search requests may be accessed at a later time by the consumer, for example, by logging into a web-site. Alternatively, the consumer may select which search results to store by entering an appropriate phrase, such as "STORE", after receiving the search results.

If an accepted offer is a rebate, coupon, or an offer for free products, the offer may be processed using the similar methodology as described in with FIG. 6. However, in other instances, the consumer may also be provided with offers to purchase one or more products directly. In this case, the consumer may accept the offer by providing an indication of the consumer's desire to purchase the product and/or a unique identifier such as a predefined pin number. The consumer's account name and/or log-in information may then be cross referenced with the consumer profile and payment account information to apply the purchase amount via the consumer's registered payment method. The consumer's name, shipping address, and other information may also be provided directly to an appropriate fulfillment processing service in order to complete the transaction. If a mobile phone number has been previously associated with the consumer, a voice or SMS text message may also be sent to the consumer using that mobile phone number to limit fraud and provide an additional verification for the purchase. As a result, the interactive media messenger module 290 enables consumers synchronize offers while shopping and complete purchases using peer-to-peer communications, all without requiring the consumer to input their payment account information and without requiring the consumer to navigate the merchant's check-out procedures.

For further illustration, FIGS. 8*a-d* provide four instances by which the interactive media messenger module may be used to enhance the consumer's online shopping experience.

Figure 8A:
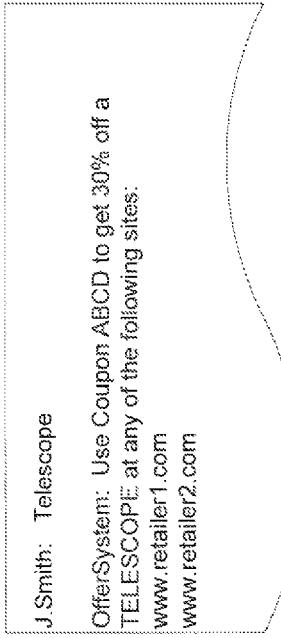
FIGS. 8a-d illustrate four examples of consumer interactions via the interactive media messenger module.
Figure 8C:
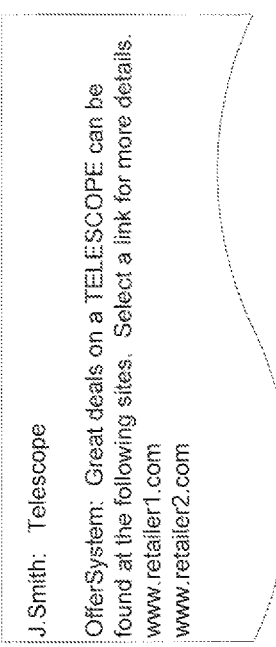
Figure 8B:
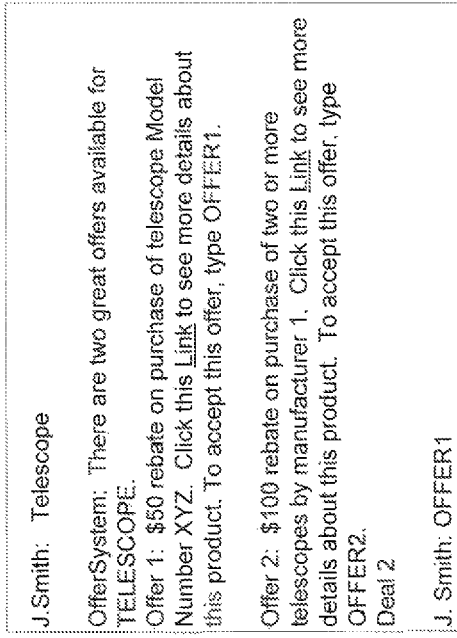
Figure 8D:
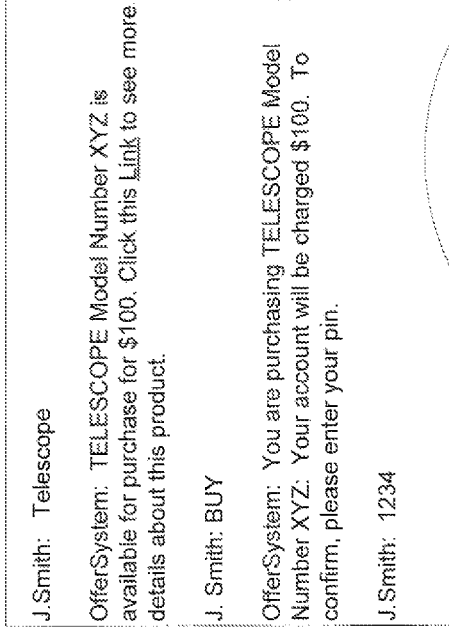

In the example shown in FIG. 8*a*, a consumer search for a "Telescope" may return an indication of several website that carry the requested product. Links to those website may then be provided to permit the consumer to quickly locate the identified product. In another example shown in FIG. 8*b*, a consumer search for a "Telescope" may return a discount code that can be applied as savings at one or more website. In a third example shown in FIG. 8*c*, a consumer search for a "Telescope" may return a purchase offer for a matching product. As shown in the example, the consumer may then complete the purchase within the peer-to-peer communication by sending the phrase "BUY" and then confirming the transaction by providing the system pin number. In a fourth example shown in FIG. 8*d*, a consumer search for "Telescope" may also return several rebate options, which may be accepted by the consumer by providing the appropriate response.

Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure cover all such modifications and variations provided they come within the scope of the following claims and their equivalents.

What is claimed is:

1. A method for processing promotional offers comprising:
at an offer processing system:
   obtaining consumer data for at least one consumer, the consumer data including a consumer ID and information identifying a payment method;
   accessing an offer catalog having a plurality of offers, each of the offers being associated with one or more products;
   identifying one or more of the plurality of offers to be provided to the consumer;
   electronically sending the one or more of the plurality of offers to the consumer;
   receiving an indication from the consumer that the consumer has accepted a respective one of the provided offers;
   accessing a product catalog to identify product codes corresponding to products associated with each of the accepted offers;
   providing the identified product codes to a transaction management system associated with the obtained payment method for the consumer;
   after providing the identified codes to the transaction management system, receiving, from the transaction management system, information identifying whether any of the identified product codes were contained in any consumer purchase transactions made using the payment method; and
   for each accepted offer, determining whether a consumer has purchased each of the products associated with the accepted offer, and processing the accepted offer if the consumer has purchased each of the associated products.

2. The method of claim 1 wherein the consumer ID is a phone number associated with the consumer.

3. The method of claim 2 wherein obtaining the consumer ID includes automatically identifying the phone number from a request message transmitted from a consumer.

4. The method of claim 3 wherein the request message is in the form of an SMS text message.

5. The method of claim 3 wherein the request message is in the form of a voice SMS message.

6. The method of claim 2 wherein the payment method is a credit card, and the transaction management system includes a credit card processing system.

7. The method of claim 6 wherein obtaining the payment method includes accessing the transaction management system to automatically identify a credit card account associated with the obtained phone number.

8. The method of claim 1 wherein electronically sending the one or more of the plurality of offers to the consumer includes sending the one or more of the plurality of offers in an SMS text message.

9. The method of claim 1 wherein electronically sending the one or more of the plurality of offers to the consumer includes sending the one or more of the plurality of offers in an SMS message having text and playable audio corresponding to the text.

10. The method of claim 1 wherein at least one of the accepted offers include an offer for a discount on one or more products purchased by the consumer.

11. The method of claim 10 wherein the consumer data further includes a preferred consumer account.

12. The method of claim 11 wherein processing the accepted offer includes applying the value of the discount associated with the offer as a credit in the preferred consumer account.

13. The method of claim 12 wherein the preferred consumer account is a credit card account.

14. The method of claim 12 wherein the preferred consumer account is an account established by the consumer with a third party consumer account operator.

15. The method of claim 14 wherein the consumer account operator is a wireless service provider for the consumer.

16. The method of claim 12 wherein the preferred consumer account is a virtual debit account.

17. A promotional offer processing system comprising:
   at least one consumer interface that enables communication between the promotional offer processing system and a plurality of consumers;
   a consumer information database for storing consumer data for a plurality of consumer profiles, the consumer data including information identifying a consumer ID and a payment method for each consumer profile;
   an offer catalog having a plurality of offers, each of the offers being associated with one or more terms for obtaining the offer;
   a product catalog having product codes corresponding to products associated with each of the accepted offers; and
   an offer management module in communication with the at least one consumer interface, the consumer information database, the offer catalog, and the product catalog; wherein the offer management module is configured to access the offer product catalog, identify one or more of the plurality of offers to be provided to a consumer, the first consumer being one of the plurality of consumers having a consumer profile in the consumer information database; cause the identified offers to be transmitted to the consumer; receive an indication from the consumer that the first consumer has accepted at least one of the provided offers; access the product catalog to identify product codes corresponding to products associated with each of the accepted offers; provide the identified product codes to a transaction management system associated with the payment method for the first consumer; receive, from the transaction management system, information identifying whether any of the identified product codes previously provided to the transaction management system were contained in consumer purchase transactions made by the first consumer using the payment method; and process each accepted offer for which the first consumer has met the one or more terms for the offer.

18. The system of claim 17 wherein the offer management module is configured to process each accepted offer for which the first consumer has met the terms by applying a discount value associated with the offer as a credit in a credit card account for the first consumer.

19. The system of claim 17 wherein the offer management module is in communication with a third party consumer account operator; and the offer management module is configured to process each accepted offer for which the first consumer has met the terms by applying a discount value associated with the offer as a credit in an consumer account held by the third party consumer account operator.

20. The system of claim 19 wherein the third party consumer account operator is a wireless service provider.

21. The system of claim 17 further including an interactive media manager module in communication with the offer management module, the interactive media manager module being configured to provided automated interactive communications with the plurality of consumers via a peer-to-peer communication application.

22. The system of claim 21 wherein the peer-to-peer communication application is at least one of an instant messaging application and a social media application.

23. The system of claim 21 wherein the interactive media manager is configured to receive a search term, and in response to receiving the search term, transmit, via the peer-to-peer communication application, one or more offers relating to the search term.

24. The system of claim 23 wherein the interactive media manager is configured to receive indications of acceptance of the one or more offers via the peer-to-peer communication platform.

* * * * *